United States Patent Office 3,239,507
Patented Mar. 8, 1966

3,239,507
ISOXAZOLYLPENICILLIN DERIVATIVES
John Herbert Charles Nayler, Cliftonville, Dorking, England, assignor to Beecham Group Limited, Brentford, England, a British company
No Drawing. Filed Oct. 14, 1963, Ser. No. 316,179
Claims priority, application Great Britain, Oct. 17, 1962, 39,239/62
5 Claims. (Cl. 260—239.1)

This invention relates to new penicillins.

In U.S. Patent No. 2,996,501 there is described and claimed a member selected from the group consisting of an acid having the formula

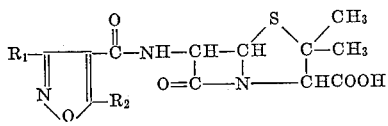

(I)

wherein $R_1$ and $R_2$ each represent a member selected from the group consisting of (lower)alkyl, (lower)alkylthio, benzylthio, cyclohexyl, cyclopentyl, cycloheptyl, benzyl, styryl, phenylethyl, phenylpropyl, furyl, thienyl, naphthyl and a member selected from the group consisting of a radical having the formula

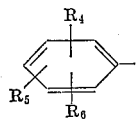

where $R_4$, $R_5$ and $R_6$ each represent a member selected from the group consisting of hydrogen, fluoro, chloro, bromo, iodo, trifluoromethyl, (lower)alkyl, (lower)alkoxy, nitro, methylsulfonyl, cyano, di(lower)alkylamino and methylmercapto and its non-toxic salts. Some of these penicillins, in addition to their potent antibacterial activity, exhibit resistance to destruction by penicillinase and are thereby effective against resistant strains of bacteria. Additionally, some of the new penicillins are stable to acids.

I have now found that certain compounds falling within the Formula I above as well as possessing all the desirable properties of these penicillins are also capable of producing very high blood levels in humans.

Accordingly, the present invention provides new penicillins of the formula

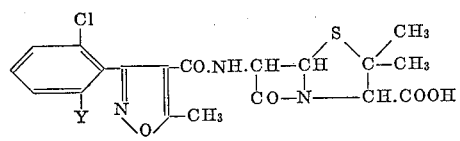

(II)

and non-toxic salts thereof, wherein Y is a chlorine or fluorine atom.

The salts are non-toxic salts including non-toxic metallic salts such as sodium potassium, calcium and aluminium, ammonium and substituted ammonium salts, e.g. salts of such non-toxic amines as trialkylamines, including triethylamine, procaine, dibenzylamine, N-benzyl-beta-phenethylamine, 1-ephenamine, $N,N^1$-dibenzylethylenediamine, dehydroabietylamine, $N,N^1$-bis-dehydroabietylethylenediamine, and other amines which have been used to form salts with benzylpenicillin.

The present invention also provides a process for the preparation of the new penicillins of the Formula II and non-toxic salts thereof wherein 6-aminopenicillanic acid or a liquor containing 6-aminopenicillanic acid, is reacted with an acid chloride, bromide, anhydride or mixed anhydride derived from a carboxylic acid of the formula:

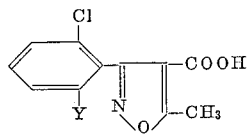

(III)

wherein Y is as defined above.

One method of preparing compounds of the present invention by way of a mixed anhydride of an alkyl chlorocarbonate comprises mixing an acid of the Formula III with the alkyl chlorocarbonate and a tertiary hydrocarbonyl or aliphatic amine such as triethylamine in an anhydrous inert and preferably water-miscible solvent such as dioxane and if desired a small amount of pure, dry acetone. To this solution of the mixed anhydride there is then added a chilled solution of 6-aminopenicillanic acid and tertiary hydrocarbonyl amine, i.e. triethylamine, in, for example, a solvent such as water to form the substituted ammonium salt of the desired product. The mixture may then, if desired, be extracted at alkaline pH with a water-immiscible solvent such as ether to remove unreacted starting materials. The product in the aqueous phase is then converted to the free acid, preferably in the cold under a layer of ether by the addition of dilute mineral acid. The free acid is then extracted into a water-immiscible, neutral organic solvent such as ether and the extract is washed with water and then dried. The product in the ethereal extract in its free acid form is then converted to any desired metal or amine salt by treatment with the appropriate base, e.g. a free amine such as procaine base or a solution of potassium 2-ethylhexanoate in dry n-butanol. These salts are usually insoluble in solvents such as ether and can be recovered in pure form by simple filtration.

Another method of preparing an ethereal solution of the acid form of a compound of the present invention comprises preparing an aqueous solution of 6-aminopenicillanic acid and sodium bicarbonate and then adding the acid chloride. The mixture is then extracted with ether to remove unreacted or hydrolysed starting materials. The solution is then acidified and the free acid form of the product is extracted into ether. This ethereal extract is dried, e.g. with anhydrous sodium sulphate, and the drying agent is removed to leave a dry ethereal solution from which the product is easily isolated, preferably in the form of an ether-insoluble salt such as the potassium salt. This procedure is used when the acid chloride reacts with a primary amine more rapidly than it does with water, as determined by simple test. In this procedure the acid chloride may be replaced by equimolecular amount of the corresponding acid bromide or acid anhydride.

In the case in which the acid chloride reacts more rapidly with water than with the 6-aminopenicillanic acid, it is necessary to use anhydrous conditions. Thus the 6-aminopenicillanic acid and triethylamine are mixed with an anhydrous solvent, e.g. acetone, chloroform or methylene dichloride and the acid chloride in the same solvent is added thereto. The mixture is then acidified and the aqueous layer removed. The solvent layer is then treated with sodium or potassium bicarbonate solution and the aqueous bicarbonate layer separated and concentrated to isolate the sodium or potassium salt of the penicillin.

Since some of the antibiotic substances obtained by the process of this invention are relatively unstable compounds which readily undergo chemical changes resulting in the loss of antibiotic activity, it is desirable to choose reaction conditions which are sufficiently moderate to avoid their decomposition. The reaction conditions chosen will, of course, depend largely upon the reactivity of the chemical reagent being used. In most instances a compromise has to be made between the use of very mild conditions for a lengthy period and the use of more vigorous conditions for a shorter time with the possibility of decomposing some of the antibiotic substances.

The temperature chosen for the process of the present invention should in general not exceed 30° C. and in many cases a suitable temperature is ambient temperature. Since the use of strongly acid or alkaline aqueous conditions in the process of this invention should be avoided, it has been found preferable to perform the process at a pH of from 6 to 9, and this can conveniently be achieved by using a buffer, for example a solution of sodium bicarbonate, or a sodium phosphate buffer. In addition to the use of aqueous media for the reaction, including filtered fermentation broths or aqueous solutions of crude 6-aminopenicillanic acid, use can be made of organic solvents, e.g. dimethylformamide, dimethylacetamide, chloroform, acetone, methylene dichloride, methyl isobutyl ketone and dioxane. Frequently it is highly satisfactory to add an aqueous solution of a salt of 6-aminopenicillanic acid to a solution of the acylating agent in an inert solvent which is miscible with water, such as acetone or dimethyl formamide. Vigorous stirring is, of course, advisable when more than one phase is present, e.g. solid and liquid or two liquid phases.

At the conclusion of the reaction, the products are isolated if desired by the techniques used with benzylpenicillin and phenoxymethylpenicillin. Thus, the product can be extracted into diethyl ether or n-butanol at acid pH and then recovered by lyophilisation or by conversion to a solvent-insoluble salt, as by neutralisation with an n-butanol solution of sodium or potassium 2-ethylhexanoate, or the product can be precipitated from aqueous solution as a water insoluble salt of an amine or recovered directly by lyophilisation, preferably in the form of a sodium or potassium salt. When formed as the triethylamine salt, the product is converted to the free acid form and thence to other salts in the manner used with benzylpenicillin and other penicillins. Thus, careful treatment of such a triethylamine compound in water with sodium hydroxide converts it to the sodium salt and the triethylamine may be removed by extraction, as with toluene. Treatment of the sodium salt with strong aqueous acid converts the compound to the acid form, which can be converted to other amine salts, e.g. procaine, by reaction with the amine base. Salts so formed are isolated by lyophilisation or, if the product is insoluble, by filtration. One method of isolating the product as a crystalline potassium salt comprises extracting the product from an acidic, aqueous solution (e.g. pH 2) into diethyl ether, drying the ether and adding at least one equivalent of a concentrated solution of potassium 2-ethyl-hexanoate in dry n-butanol. The potassium salt forms, precipitates, usually in crystalline form, and is collected by filtration or decantation.

The compounds of the present invention may be employed in admixture with suitable pharmaceutical carriers. The present invention therefore includes a composition comprising a pharmaceutical carrier and a new penicillin of the Formula II or a non-toxic salt thereof.

The following examples illustrate the invention:

EXAMPLE I

*3-(2',6'-dichlorophenyl)-5-methyl-4-isoxazolylpenicillin (sodium salt)*

A suspension of 6-aminopenicillanic acid (52.5 g.) in water (484 ml.) was adjusted to pH 7.2 by the addition of N aqueous sodium hydroxide and the resulting solution was treated with a solution of 3-(2',6'-dichlorophenyl)-5-methylisoxazole-4-carbonyl chloride (70.5 g.) in isobutyl methyl ketone (726 ml.). The mixture was stirred vigorously for 1½ hours and then filtered through "Dicalite." The layers were separated and the isobutyl methyl ketone layer was shaken with saturated brine. After separating the layers, the isobutyl methyl ketone phase was filtered and then treated with 125 ml. of a 2 N solution of sodium 2-ethyl-hexoate in isopropanol to give a clear solution. The sodium salt of 3-(2',6'-dichlorophenyl)-5-methyl-4-isoxazolylpenicillin (63.9 g.) separated as a white microcrystalline monohydrate which was collected by filtration and dried in air. It had a decomposition point of 214° C. and $[\alpha]_D^{21}$+132.8° (c., 1 in $H_2O$). Found: C, 44.2; H, 3.8; N, 8.3; S, 6.6. $C_{19}H_{16}Cl_2N_3O_5SNa$, $H_2O$ requires C, 44.7; H, 3.5; N, 8.2; S, 6.3%).

The product inhibited *Staph. oxford* at 0.1 mcg./ml., the benzylpenicillin-resistant Staph. 1 at 0.5 mcg./ml., and the benzylpenicillin-resistant Staph. 2 at 0.5 mcg./ml.

3 - (2',6' - dichlorophenyl) - 5 - methylisoxazole - 4 - carboxylic acid, M.P. 220–221°, was obtained from the condensation of 2,6-dichlorobenzohydroxamoyl chloride with methyl acetoacetate in methanolic sodium methoxide followed by hydrolysis of the resulting ester. The acid chloride resulted from the treatment of the acid with thionyl chloride.

EXAMPLE II

*3-(2',6'-dichlorophenyl)-5-methyl-4-isoxazolylpenicillin (free acid)*

A suspension of 6-aminopenicillanic acid (216 g.) in water (2 l.) was adjusted to pH 6.8 by the addition of N aqueous sodium hydroxide (approx. 1 l.) and the resulting solution was stirred vigorously whilst a solution of 3-(2',6'-dichlorophenyl)-5-methyl-isoxazole - 4 - carbonyl chloride (290 g.) in acetone (1.5 l.) was added in one portion. The temperature rose to 26° and as reaction proceeded the free acid form of the penicillin separated as a white solid. After 30 minutes the suspension was cooled to 10° and stirring was continued at this temperature for 1 hour more. The mixture was then cooled to 0°, centrifuged, and the solid product washed with aqueous acetone (250 ml.) and finally dried in an air oven at 30°. The product (440 g., 94%) had $[\alpha]_D^{20}$+106.3° (c., 1 in EtOH) and was shown by alkalimetric assay to be 97.5% pure.

EXAMPLE III

*3-(2',6'-dichlorophenyl)-5-methyl-4-isoxazolylpenicillin (potassium salt)*

This salt was prepared by dissolving the free acid form of the penicillin in the equivalent amount of aqueous potassium bicarbonate and freeze-drying the resulting solution. The hydrated salt so obtained was shown by alkalimetric assay to be 94% pure and to contain 6% water. It had $[\alpha]_D^{20}$+127.2° (c., 1 in $H_2O$).

EXAMPLE IV

*3-(2'-chloro-6'-fluorophenyl)-5-methyl-4-isoxazolylpenicillin*

This was prepared by treating 6-aminopenicillanic acid (36.4 g.) with 3-(2'-chloro-6'-fluorophenoyl)-4-methylisoxazole-4-carbonyl chloride (46.1 g.) by the method of Example I, except that precipitation of the sodium salt only took place after dilution of the mixture with ether. In this way there was obtained 60.7 g. of the penicillin sodium salt having a purity of 88% as determined by alkalimetric assay.

The product inhibited *Staph. oxford* at a concentration of 0.25 mcg./ml. and a benzylpenicillin-resistant staphlococcus at 1.25 mcg./ml.

3 - (2' - chloro - 6' - fluorophenyl) - 5 - methylisoxazole-4-carboxylic acid, M.P. 206–207°, was obtained by chlorinating 2-chloro-6-fluorobenzaldoxime, then condensing the resulting hydroxamoyl chloride with methyl acetoacetate in methanolic sodium methoxide and hydrolysing the resulting ester with hot alkali. The acid chloride resulted from treatment of the acid with thionyl chloride.

BLOOD LEVEL DATA

The products of Examples I to IV were each administered by mouth to groups of human volunteers, the dose being 500 mg. in each case. Blood samples were then taken at regular intervals and the concentrations of antibiotic obtained in the serum were measured by bioassay. Average results obtained for each group are shown in the table in comparison with those given by 3-o-chlorophenyl-5-methyl-4-isoxazolylpenicillin sodium salt (cloxacillin). It will be seen that each of the new penicillins gave serum levels higher and/or more prolonged than those given by cloxacillin.

| Product of Example No.— | Serum concentrations (mcg./ml.) | | | |
|---|---|---|---|---|
| | ½ hr. | 1 hr. | 2 hr. | 4 hr. |
| 1 | 18.8 | 21.6 | 13.1 | 3.4 |
| 2 | 7.2 | 12.3 | 12.2 | 3.0 |
| 3 | 29.2 | 21.0 | 9.2 | 2.8 |
| 4 | 25.4 | 21.9 | 9.2 | 2.6 |
| Cloxacillin | 12.3 | 13.7 | 5.6 | <2 |

I claim:
1. A member selected from the group consisting of an acid of the formula:

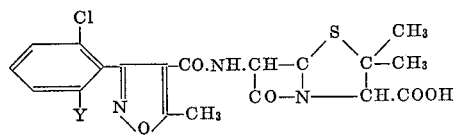

wherein Y is a member selected from the group consisting of chlorine and fluorine; and its sodium, potassium, calcium, aluminium and ammonium salts and its non-toxic substituted ammonium salts with amines selected from the group consisting of tri(lower)alkylamines, procaine, dibenzylamine, N-benzyl-beta-phenethylamine, 1 - ephenamine, N,N'-dibenzylethylenediamine, dehydroabiethylamine, N,N'-bis-dehydroabietylethylenediamine and N-(lower)alkylpiperidines.

2. 3-(2',6'-dichlorophenyl)-5-methyl-4 - isoxazolylpenicillin.

3. The sodium salt of 3 - (2',6' - dichlorophenyl) - 5-methyl-4-isoxazolylpenicillin.

4. The potassium salt of 3 - (2',6' - dichlorophenyl)-5-methyl-4-isoxazolylpenicillin.

5. The penicillin of the formula:

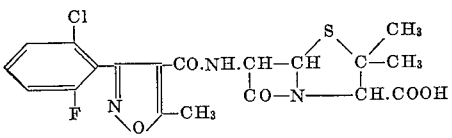

References Cited by the Examiner

UNITED STATES PATENTS 2,996,501   8/1961   Doyle et al. _____ 260—239.1

HENRY R. JILES, *Acting Primary Examiner.*

NICHOLAS S. RIZZO, *Examiner.*

J. W. ADAMS, *Assistant Examiner.*